March 23, 1971 J. C. PINTO 3,572,356
RELIEF VALVE WITH ALTITUDE COMPENSATION
Filed Sept. 23, 1968 2 Sheets-Sheet 1
FIG_1
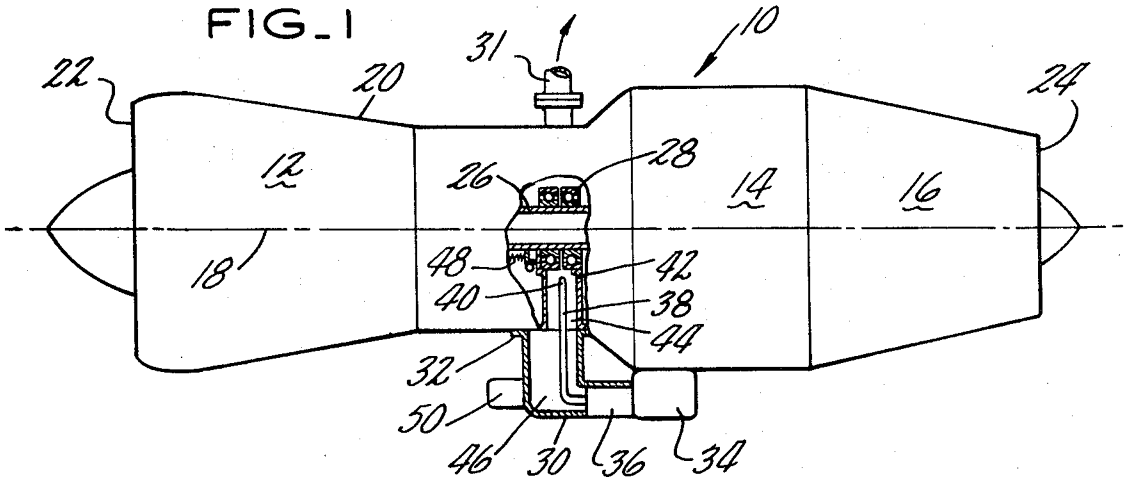
FIG_5
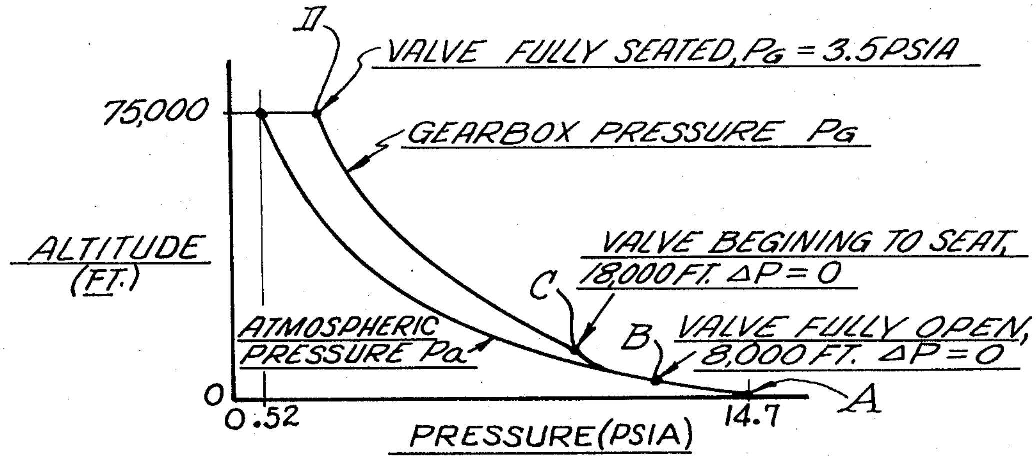
INVENTOR
JAMES C. PINTO
BY Vernon F. Hauschild
ATTORNEY FIG. 2 SEA LEVEL CONDITION
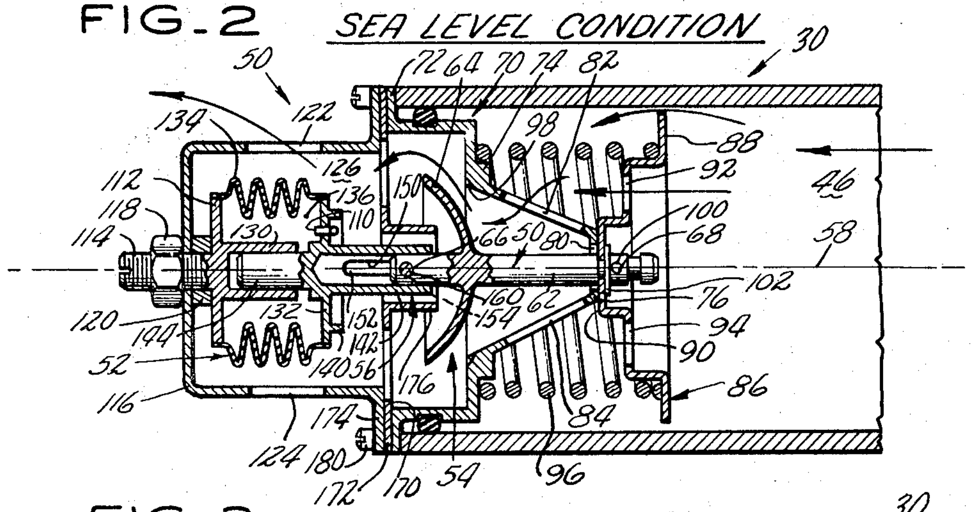
FIG. 3 LOW ALTITUDE CONDITION
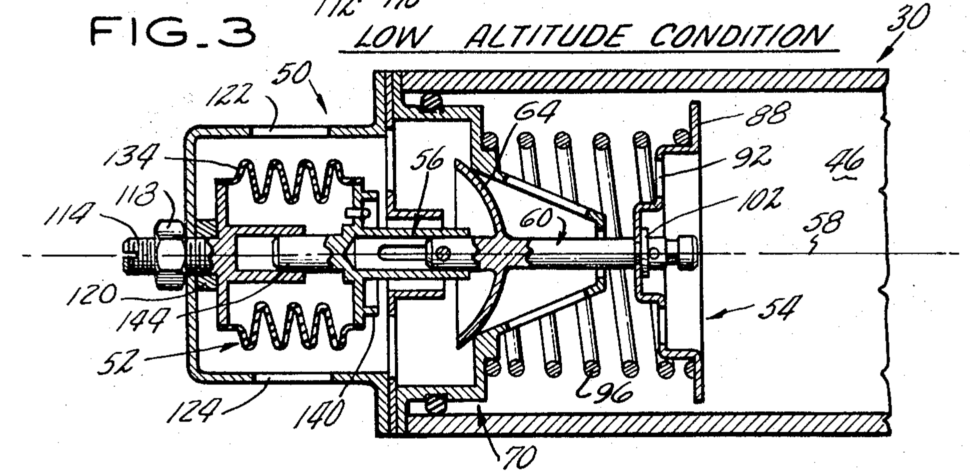
FIG. 4 HIGH ALTITUDE CONDITION
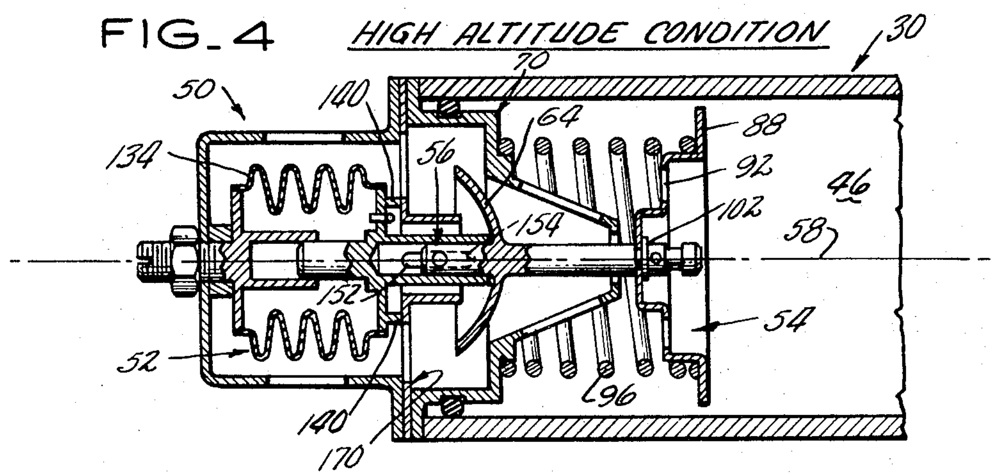
INVENTOR
JAMES C. PINTO United States Patent Office 3,572,356
Patented Mar. 23, 1971

3,572,356
RELIEF VALVE WITH ALTITUDE COMPENSATION

James C. Pinto, Hartford, Conn., assignor to United Aircraft Corporation, East Hartford, Conn.

Filed Sept. 23, 1968, Ser. No. 761,783
Int. Cl. F02c 7/06
U.S. Cl. 137—81 11 Claims

ABSTRACT OF THE DISCLOSURE

A relief valve of the pressure responsive poppet type which is connected to an altitude responsive bellows so as to be held open by the collapsed bellows at sea level and so as to be divorced from the operation of the bellows and act as a true pressure responsive poppet valve independent of the bellows during altitude operation.

BACKGROUND OF THE INVENTION

Field of invention

This invention relates to pressure relief valves intended for use on aircraft engines of the jet type and which is adapted to be connected to a device, such as an accessory gear box on a conventional turbine-type engine, to maintain the gear box pressure at a point between sea level atmospheric pressure and some arbitrary lower pressure such as 3.5 p.s.i.a. In Jet engine operation it has been determined that if the pressure in the auxiliary gear box falls below a certain limit, such as 3.5 p.s.i.a., oil pump cavitation occurs. It has also been determined that if the pressure within the gear box is permitted to build up during sea level operation so that it approaches compressor pressure during engine idling, the pressure drop across oil seals which are positioned between the gear box chamber and the engine compressor chamber will permit oil weeping thereby thus allowing the aircraft cabin to be polluted with oil mist via the compressor bleed system; and also allowing the undesirable deposit of oil contaminates on hot rotating parts which can lead to a stress corrosion failure. In addition, gear box lubricating oil can be replaced in an unpressurized gear box. For these reasons, it is desirable to utilize a pressure relief valve on the gear box which has altitude compensation so as to fully vent the gear box at sea level and thereby prevent oil seal weepage and the attendant engine air pollution and undesirable effects caused thereby, and to provide pressure responsive poppet-type pressure control of the gear box at altitude so that the gear box pressure never falls below a selected absolute pressure, such as 3.5 p.s.i.a., thereby eliminating oil pump cavitation in the auxiliary gear box.

Description of the prior art

Pressure relief valves with altitude compensation are known in the prior art. For example, pressure relief valves having a spring biased poppet valve and an aneroid bellows actuated valve in parallel are known in the prior art, however, such an arrangement requires two separate valves with the attendant extra weight and presents the problem of providing two accurately machined valve-to-seat arrangements. In addition, an altitude responsive valve and a poppet valve in series is utilized in the U.S. Golob Pat. No. 2,639,726 but such an arrangement is also a double valve arrangement with the extra parts, extra weight, extra machining and assembly problems attendant thereto.

SUMMARY OF INVENTION

A primary object of the present invention is to provide a pressure relief valve which includes a pressure responsive poppet valve which operates in normal fashion at altitudes and which is wedded to an aneroid bellows so as to be moved thereby to its fully open position at sea level.

In accordance with the present invention, a conventional pressure responsive poppet valve is spring biased to a closed position and is connected to an aneroid or evacuated bellows in such a fashion that the poppet valve operates independent of the bellows at altitudes and is wedded to the aneroid bellows at sea level so that the collapsed bellows maintains the poppet valve open.

In accordance with still a further aspect of the present invention, the connecting means between the poppet valve and the bellows is a pin extending through the valve stem and through longitudinal slots in opposite walls of a tube projecting from the bellows so that the poppet valve must move with the bellows when the pin abuts either of the ends of the wall slots and so that the poppet valve may move independently of the bellows when the pin is positioned between the ends of the wall slots.

In accordance with a further aspect of the present invention, a single valve and seat operates as a bellows controlled valve and a pressure relief valve at different flight regimes, thereby reducing the weight, size, number of complex parts and cost of the prior art double valve assemblies.

In accordance with a further aspect of the invention, a single valve is provided to maintain pressure within a chamber between prescribed limits.

In accordance with still a further aspect of this invention, the heavy springs which are utilized inside the prior art bellows can be reduced in size or eliminated because the common poppet spring provides the necessary reaction for the bellows by virtue of its series arrangement with the bellows.

It is still a further aspect of this invention that a single spring acts to hold the valve assembly together before it is bolted in place, thus eliminating the need for screws and other retaining devices.

This invention permits disassembly of the entire valve unit by simply removing a single nut and two loose fitting, captive pins.

It is still a further object of this invention to teach an altitude compensated pressure relief valve for use in such devices as accessory gear boxes for jet-type aircraft engine in which the gear box can be pressurized at altitude to prevent oil-pump cavitation since the valve operates as a simple poppet valve during altitude operation, and which poppet valve is forced to an open position by an aneroid bellows at sea level so as to prevent pressure build-up within the gear box and thereby increase the pressure differential across the gear box oil face-seals to prevent oil weepage and hence the undesirable effects of engine air pollution at sea level. In this single-valve arrangement, the aneroid bellows is connected to the poppet valve so as to control the position thereof at sea level and so as to permit completely independent poppet valve motion with respect thereto at altitude.

It is a further feature of this invention that the valve be fail-safe wherein a rupture in the aneroid bellows would not cause the poppet valve to seat and hence pressurize the gear box and cause the attendant oil seal leakage and engine air pollution. Such a bellows failure at sea level would merely cause the bellows to deactivate itself and free the poppet valve for conventional pressure responsive poppet operation.

It is accordingly a further aspect of this invention that the slot-in-pin connection between the poppet valve and the aneroid bellows divorces the poppet valve from the aneroid bellows both during altitude operation and when there is a bellows failure at sea level.

BRIEF DESCRIPTION OF THE DRAWING

FIG. 1 is a side view of a modern, aircraft, turbine-type engine, partially broken away to reveal the environment of the altitude responsive pressure relief valve taught herein.

FIG. 2 is a showing of the pressure relief valve in its sea level condition.

FIG. 3 is a showing of the valve in its low altitude condition with no excess gearbox pressure.

FIG. 4 is a showing of the valve in its high altitude condition while relieving excess gearbox pressure.

FIG. 5 is a graph illustrating the operation of this valve.

DESCRIPTION OF THE PREFERRED EMBODIMENT

Referring to FIG. 1 we see modern aircraft turbine-type engine 10 which comprises compressor section 12, combustion chamber section 14, and turbine section 16 which are positioned in alignment concentrically about engine axis 18 and enveloped within engine case or housing 20. Air enters engine 10 through engine inlet 22, the air is compressed in passing through compressor section 12, is heated and has energy added thereto in passing through combustion chamber section 14, has energy extracted therefrom so as to drive compressor 12 in passing through turbine section 16, and is discharged to atmosphere through exhaust outlet 24. Exhaust outlet 24 may have a variable area exhaust nozzle of conventional design and a conventional afterburner may be positioned between the turbine section and the exhaust outlet. Engine 10 may be operated as a jet engine wherein the exhaust gases are discharged to atmosphere to generate thrust, may be used to drive a propeller or may be used to drive a free turbine to power some other flight mechanism such as a helicopter rotor. Engine 10 may be of the type more fully described in U.S. Pat. Nos. 2,711,631 or 2,747,367.

Shaft 26, which is concentric about axis 18, supports the compressor and the turbine and is supported in turn by bearings such as 28, which are preferably of the anti-friction type and are in turn supported from the engine case 20 by conventional supports. Auxiliary gear box 30 is connected to engine case 20 at flange 32 and includes oil tank 34, which is connected to feed oil to oil pump 36, which is of the intermeshing rotary gear type and which transmits pressurized oil to bearings 28 through tube 38, to be projected as a lubricant stream against bearings 28 through nozzle or spray member 40. Duct or conduit means 42 forms chamber 44 therewith and connects chamber 44 to the gearbox interior chamber 46 so that bearings 28 and their oil supply mechanism 34–40 is separated from the remainder of the engine includnig the interior of compressor section 12. A conventional carbon-type seal 48 is positioned between the interior of the compressor 12 and chamber 44 so as to prevent the leakage of oil from chamber 44 into the compressor interior since such oil leakage causes polluted air to be delivered to the cabin through the engine bleed system 31.

Pressure relief valve 50 is connected to auxiliary gear box 30 and communicates with the interior 46 thereof to perform the function of venting the gear box to atmosphere when engine 10 is operating at sea level and serving as a conventional poppet-type valve to pressurize the interior 46 of the gear box 30 when engine 10 is operating at altitude. The purpose of venting the gear box 30 at sea level pressure is to increase the pressure drop across conventional carbon seal 48 between the interior of compressor 12 and the gear box interior, thereby providing a seal seating force for seal 48. The purpose of pressurizing the interior of auxiliary gear box 30 at altitude is to prevent cavitation of the oil being pumped to bearings 28 by oil pump 36.

Now referring to FIGS. 2–4 we see my pressure regulating valve 50 in greater particularity. Valve 50 consists primarily of aneroid evacuated bellows 52 and poppet valve assembly 54, which are in alignment and concentric about valve axis 58 and which are connected by connecting means 56. Poppet valve assembly 54 includes valve member 60, which includes a valve stem 62 extending on both sides of valve skirt or flange 64. Bored hole or aperture 66 extends through one end of valve stem 62 while aperture 68 extends through the other end thereof. Valve seat defining member 70 envelops valve member 60 and includes circumferential flange portion 72, which projects radially and concentrically around axis 58, valve seat defining portion 74 and positive stop portion 76, positioned along axis 58. Aperture 80 in valve seat defining member 70 permits the passage of valve stem 62 therethrough while apertures 82 and 84 permit airflow therethrough from chamber 46 to atmosphere when poppet valve assembly 54 is open. Poppet valve assembly 54 also includes spring retainer member 86, which includes circumferential flange portion 88 and apertured elevated portion 90, as well as apertures 92 and 94 to permit the passage of air therethrough. Coil spring 96 extends between valve seat defining member 70 and the cylindrical flange portion 88 of spring retainer 86 and serves to bias valve member 60 to a closed position wherein valve skirt 64 seats against mating surface 98 of valve seat defining portion 74. Spring retainer 86 is connected to valve stem 62 by pin member 100, which is held captive in the recess formed in spring retainer 88 and which extends through aperture 68 in valve stem 62, and further which is positioned with respect to spring retainer 86 by calibration washer 102.

Aneroid bellows 52, which is preferably evacuated through appropriate tube 110 so as to be pressure responsive and, in particular, altitude responsive, includes fixed plate member 112 which has threaded bolt 114 projecting from one side thereof and serves to attach bellows 52 to fixed bellows housing 116 when nut member 118 is threaded onto bolt 114. Washer or sleeve 120 is preferably positioned between plate member 112 and housing 116. Appropriate apertures such as 122 and 124 are located in the walls of housing 116 to place chamber 126 into communication with atmosphere so that the exterior of bellows 52 is subjected to atmospheric pressure at all times. Tube member 130 also extends from plate member 112 and serves in a fashion to be described hereinafter to cause bellows 52 to expand and contract along axis 58. In view of the connection just described between bellows plate member 112 and housing 116, it will be noted that the plate member 112 is fixed in position. Movable plate member 132 is positioned at the opposite end of bellows 52 and both plate members 112 and 132 are sealably connected to expandable bellows member 134 so as to define evacuated chamber 136 therewithin. Plate member 132 has stop ring 140 projecting therefrom, as well as tube member 142 and cylindrical projection 144. By viewing FIG. 2 it will be noted that cylindrical projection 144 is received in mating engagement by tube member 130 of bellows plate member 112 so as to cause bellows unit 52 to expand and contract along axis 58.

Tube member 142 forms part of connecting means 56 between aneroid bellows 52 and poppet valve assembly 54 and has slots 150 located in the opposite walls thereof and extending along axis 58 and each including end surfaces 152 and 154. Cylinderical pin 160 extends through aperture 66 in valve stem 62 and through slots 150 in the opposite walls of tube member 142 of bellows 52 so as to form a connection 56 between the poppet valve member 60 and the aneroid bellows 52.

Stop member 170 includes radial flange portion 172, which is sandwiched between flange portion 72 of valve seat defining member 70 and flange portion 174 of bellows cover 116. Stop member 170 further includes sleeve member 176, which concentrically envelops slots 150 and pin 160 to retain the pin in position within the valve stem 62 and slots 150 during normal operation.

Bolt means 180 pass through flanges 72, 172 and 174 to connect valve assembly 150 to the auxiliary gear box housing 30. It will therefore be seen that in this fashion, valve seat defining member 70 of poppet valve assembly 54 is stationary, as is stop member 170 and bellows housing 116, while aneroid bellows 52 and valve member 60 are movable along valve axis 58.

OPERATION

As described previously, when engine 10 is operating at sea level, it is highly desirable to prevent pressure buildup within gear box interior 46 since this pressure buildup reduces the pressure drop across oil seal 48 and when engine 10 is idling, permits oil leakage past seal 48 and the attendant air pollution within the engine. Accordingly, at sea level operation, it is the function of valve 50 to vent the interior 46 of auxiliary gear box 30 to atmosphere at the sea level condition of valve 50 as shown in FIG. 2. By viewing FIG. 2 it will be noted that the sea level atmospheric pressure operating on the exterior of aneroid bellows 52 has collapsed the bellows and thereby caused end plate member 132 and sleeve member 142 of bellows 52 to move leftwardly until the end surface 154 of slots 150 engaged pin 160 and thereafter caused valve member 60 to move leftwardly with bellows 52 thereby opening poppet valve assembly 54 until, with elevated portion 90 of spring retainer 86 abutting positive stop portion 76 of valve seat defining member 70, the poppet valve assembly 54 is in its full open position thereby venting the interior of the gear box housing 30 to atmosphere to prevent a pressure buildup therewithin. This pressure buildup would otherwise be caused by the leakage of compressor pressure into the interior 46 of gear box 30. It will accordingly be seen that when engine 10 is operating at sea level, valve 50 serves to vent the interior 46 of auxiliary gear box 30 to atmosphere. It will also be seen that during sea level operation, connecting means 56 weds or connects poppet valve 54 to aneroid bellows 52 so that the two operate together.

As mentioned previously, at altitude operation, it is desired to divorce the coaction between poppet valve member 54 and aneroid bellows 52 and this is accomplished as best shown in FIGS. 3 and 4. Referring to FIG. 3 we see the low altitude condition of valve 50 wherein, due to reduced atmospheric pressure, aneroid bellows 52 has begun to expand and thereby permit spring 96 to move valve 60 to a seated position but to a condition in which any pressure increase in cavity 46 will force valve 60 open. It will be noted that as valve 50 operates between its FIGS. 2 and 3 positions, the poppet valve and the aneroid barometer continue to operate in unison due to the action of connection 56.

As altitude increases, the atmospheric pressure reduces and aneroid bellows 52 expands further to its FIG. 4 condition wherein positive stop flange 140 of bellows 52 is positioned against stop member 170, thereby, in effect, fully deactivating bellows 52 since it can no longer expand. With bellows 52 so seated, the full biasing force of spring 96 serves to seat or close poppet valve assembly 54, and thereby seal off the interior 46 of gear box housing 30. With poppet valve 54 closed, the interior 46 of gear box 30 is pressurized by compressor 12 so as to prevent cavitation of the oil in oil pump 36. Spring 96 and calibration washer 102 are selected so that valve 60, which is now operating in its FIG. 4 condition as a pure poppet valve fully divorced from aneroid bellows 52, will open at a selected pressure in gear box chamber 46. Experience has shown that for aircraft engines of the turbine-type which are intended for high altitude flight can best use a poppet valve which opens when the pressure drop thereacross exceeds 3.0 p.s.i.a., thereby maintaining a pressure within chamber 46 at about 3.5 p.s.i.a. at high altitude.

Valve 50 has a fail-safe feature wherein a rupture in bellows 52, would not cause valve 60 to seat due to the bottoming out of bellows 52, but would allow the valve to operate as a conventional poppet valve and prevent pressure buildup within gear box cavity 46 so as to avoid the oil seepage and pollution problem referred to supra.

The operation of valve 50 is illustrated graphically in FIG. 5 wherein one of the coordinates of the FIG. 5 graph is the altitude of the engine in feet while the other is the altitude pressure in pounds per square inch absolute (p.s.i.a.) and gear box pressure $P_G$ is plotted along with atmospheric air $P_a$. With engine 10 at sea level, the atmospheric pressure is 14.7 p.s.i.a. and the valve 50 is in its fully opened position shown in FIG. 2. This point is represented as point A on the FIG. 5 graph. As engine 10 increased in altitude to about 8,000 feet, the valve remains fully open at point B on the graph, however, a balance exists between the biasing force of spring 5 to a valve closed position and the opening valve force of bellows 52 to a valve open position so that the valve remains fully open but in a balance force condition. As we continue to increase in altitude, aneroid bellows 52 expand further to the 18,000 feet altitude condition shown at point C on the graph, at which time poppet valve 60 is fully closed by way of motion but there is no force causing it to seat so that any pressure differential thereacross will cause the valve to open. Valve 50 is now in its FIG. 3 position. As we continue to increase in altitude, bellows 52 eventually bottoms out as shown in its FIG. 4 condition and permits poppet valve 60 to be fully seated by the full force of biasing spring 96 so that the aneroid bellows 52 and the poppet valve assembly 54 are now divorced and the poppet valve 54 operates as a conventional poppet valve and is shown in a partially open position in FIG. 4. This is illustrated at point D on the chart which is the 75,000 foot altitude point. As engine 10 decreases in altitude, the reverse procedure occurs.

Another important feature of this valve is ease of assembly and disassembly. To disassemble this valve merely requires the removal of pins 100 and 160. To assemble the valve, valve member 60 is positioned in valve seat defining member 70 and spring 96 and spring retainer 86 are placed in position and retained in position by calibrating washer 102 and pin 100. It will be noted that at this stage of the assembly, we have a simple poppet valve. This poppet valve is then bench calibrated so as to open at the proper pressure differential thereacross and this is determined by the force of spring 96 and the particular calibration washer 102 chosen. With poppet valve assembly 54 so calibrated, pin 100 and calibration washer 102 are removed so as to permit a connection between valve 54 and bellows 52. This connection is accomplished by moving valve 60 leftwardly as illustrated in FIGS. 2–4 so that aperture 60 is to the left of stop member 170, thereby permitting the entry of retaining pin 160 through slots 150 and aperture 66, thereby forming connecting member 56. The pin member 160, so assembled, is then moved within retainer sleeve 176, so it is captivated therewithin, and the calibrated washer 102 and retaining pin 100 are again assembled in position. It will therefore be noted that valve 50 is completely held together by the action of spring 96 and bellows 52.

With valve 50 assembled, it is ready for attachment by any convenient bolt arrangement 180 to a housing such as auxiliary gear box housing 30. It has also been found desirable to pass a pin through abuting flange members 72, 172, and 174 when valve 50 is assembled and prior to bolting it to its final attachment, such as housing 30, so as to prevent relative rotation around axis 46 of the various valve parts.

From the above description it will be evident that valve 50 serves as a conventional poppet valve at altitude and is altitude pressure responsive at sea level operation. While the valve has been illustrated and described in a modern flight jet engine environment, it will be obvious to those skilled in the art that it could also be used in any environment which requires conventional poppet valve operation so as to perform a pressure control function when the external pressure is low, and which further requires chamber venting when the external pressure is high.

In addition, while this invention has been illustrated on symmetrically shaped blades only, the principle is valid for cambered airfoil as well.

I claim:

1. A relief valve with altitude compensation including:

(a) a poppet valve assembly including:

(1) a poppet valve member having:

(A) a valve stem member with a hole extending laterally through one end thereof, (B) a valve skirt member extending laterally from said valve stem member and positioned between opposite ends thereof, (2) a valve seat member concentric about said poppet valve member and coaxial therewith and including:

(A) a circumferential flange member extending radially from said axis at one end thereof, (B) a positive stop member at the opposite end thereof and positioned along said axis from said flange member, (C) and further including a valve seat defining member positioned between said flange and said positive stop member and having apertures between the valve seat portion and the positive stop portion to permit gas flow therethrough, (3) a spring retainer member connected to said valve stem end opposite said aperture and being movable in a first direction with said poppet valve member to abut said positive stop member and thereby limit the amount of opening of said poppet valve member with respect to said valve seat defining member and in the opposite direction to cause said poppet valve to seat against said seat member, (4) and spring means extending between said spring retainer and said valve seat member to bias said poppet valve to a closed position and so that the biasing spring force must be overcome to open said poppet valve, (b) altitude responsive bellows mechanism coaxial with said poppet valve assembly including:

(1) a tube member extending from one end thereof and enveloping said apertured end of said valve stem member and having:

(A) longitudinal slots through the opposite walls thereof, (2) a pin extending through said valve at said stem aperture and said wall slots to connect said poppet valve to said bellows for movement therewith when said pin is bottomed at one of the ends of said slots and to permit relative motion between said poppet valve and said bellows as said pin moves between the ends of said slots, (3) bellows housing means including a housing member concentric about said axis and enveloping said bellows, (4) means connecting the end of said bellows opposite said sleeve to said bellows housing so as to fix that end of the bellows with respect to the bellows housing, (5) means to concentrically guide the motion of said bellows along said axis, (6) and aperture means extending through said bellows housing to place said bellows into communication with atmosphere so that said bellows collapses at sea level atmosphere causing said sleeve member to move toward the fixed end of said bellows until said pin engages one end of said slots of said tube member and then causing said poppet valve to move with said bellows until said spring retaining member positively abuts said positive stop portion of said valve seat member and so that said bellows expands at altitude to permit said poppet valve to be urged by said spring to bear against said seat portion of said valve seat member, (7) and positive stop means selectively positioned to limit the expansion motion of said bellows so that with said bellows so positively stopped, said poppet valve may be moved away from said valve seat portion as said pin moves within said slots so that said proppet valve operates in conventional poppet valve pressure regulating fashion at altitude.

2. Apparatus according to claim 1 and including means connecting said bellows housing to said valve seat member so that said relief valve is a fully connected subassembly.

3. Apparatus according to claim 2 and including a ring member enveloping said pin to prevent said pin from slipping out of said valve stem aperture and said slots during normal operation and selectively positioned with respect to said slots so that said slots extend therebeyond so that said valve stem may be positioned with respect thereto to free said pin for removal during relief valve disassembly.

4. Apparatus according to claim 1 including means connecting said spring retainer member to said valve stem including a calibration washer of selected thickness and a pin extending laterally through the valve stem so as to determine the biased force of said spring means and hence the pressure which said poppet valve assembly will maintain at altitude.

5. Apparatus according to claim 1 wherein said bellows housing and said positive stop means have circumferential flange of said valve seat member to permit sealably connecting said relief valve to said pressure chamber defining means so that the poppet valve is subjected to the pressure of the chamber and so that the bellows projects therefrom into atmosphere.

6. A pressure relief valve with altitude compensation including:

(A) a poppet valve biased to a closed position and adapted to communicate with a pressurized chamber so as to be opened to relieve the pressure in said chamber when the chamber pressure becomes excessive, (B) an altitude responsive bellows, (C) means connecting said bellows to said poppet valve so that said poppet valve operates free of said bellows at altitude and so that said bellows and said poppet valve move in unison at sea level, and wherein said poppet valve includes a valve stem extending along the valve motion axis and wherein said bellows has a tube shaped member extending therefrom and enveloping said valve stem and having slots in the walls thereof extending along said axis and wherein a pin extends through said valve stem and said tube member slots so that the poppet valve is free to move independently of the said bellows as said pin moves between the opposite ends of said slots and wherein said bellows and said poppet valve are interconnected for motion together when said pin is bottomed at either end of said sots.

7. Apparatus according to claim 6 and including means to deactivate said bellows at altitude so that said poppet valve operates as a conventional pressure responsive poppet valve.

8. A pressure relief valve with altitude compensation including:

(A) a poppet valve biased to a closed position and adapted to communicate with a pressurized chamber so as to be opened to relieve the pressure in said chamber when the chamber pressure becomes excessive, (B) an altitude responsive bellows, (C) means connecting said bellows to said poppet valve so that said poppet valve operates free of said bellows at altitude and so that said bellows and said poppet valve move in unison at sea level, and wherein said poppet valve includes a valve stem extending along the valve motion axis and wherein said bellows has a tube shaped member extending therefrom and enveloping said valve stem and having slots in the walls thereof extending along said axis and wherein a pin extends through said valve stem and said tube member slots so that the poppet valve is free to move independently of the said bellows as said pin moves between the opposite ends of said slots and wherein said bellows and said poppet valve are interconnected for motion together when said pin is bottomed at either end of said slots, and including sleeve means enveloping said slots and pin to retain said pin within said valve stem and tube member slots.

9. A pressure relief valve with altitude compensation including:

(A) a poppet valve biased to a closed position and adapted to communicate with a pressurized chamber so as to be opened to relieve the pressure in said chamber when the chamber pressure becomes excessive, (B) an altitude responsive bellows, (C) means connecting said bellows to said poppet valve so that said poppet valve operates free of said bellows at altitude and so that said bellows and said poppet valve move in unison at sea level, and wherein said connecting means is a slot-pin connection wherein said pin is bottomed in said slot to cause said poppet valve to move with said bellows at sea level and wherein said pin is positioned between the end walls of said slot to permit said poppet valve to move independently of said bellows at altitude.

10. A pressure release valve with external pressure compensation including:

(A) a single, flow restricting, poppet valve which is biased to a closed position and which is adapted to communicate with a pressurized chamber and the region external of said chamber so as to open to relieve the pressure in said chamber when the pressure chamber becomes excessive, (B) a pressure responsive bellows mounted to be continuously external pressure responsive, (C) means connecting said bellows to said poppet valve so that said poppet valve operates free of said bellows at reduced external pressure conditions and so that said bellows and said poppet valve move in unison at elevated external pressure conditions so that said poppet valve is external pressure responsive at all times.

11. A pressure release valve with external pressure compensation including:

(A) a single, flow restricting, poppet valve which is biased to a closed position and which is adapted to communicate with a pressurized chamber and the region external of said chamber so as to open to relieve the pressure in said chamber when the pressure chamber becomes excessive, (B) a pressure responsive bellows mounted to be continuously external pressure responsive, (C) means connecting said bellows to said poppet valve so that said poppet valve operates free of said bellows at a first selected external pressure condition and so that said bellows and said poppet valve move in unison at a second selected external pressure condition so that said poppet valve is external pressure responsive at all times.

References Cited

UNITED STATES PATENTS 2,639,726 5/1953 Golob ------------- 137—81X
2,919,711 1/1960 Lord et al. ---------- 137—81

WILLIAM F. O'DEA, Primary Examiner

R. GERARD, Assistant Examiner

U.S. Cl. X.R.

60—39.08